(12) United States Patent
Taniyama

(10) Patent No.: US 7,599,131 B2
(45) Date of Patent: Oct. 6, 2009

(54) IMAGING LENS

(75) Inventor: Minoru Taniyama, Saitama (JP)

(73) Assignee: Fujinon Corporation, Saitama-shi, Saitama (JP)

( * ) Notice: Subject to any disclaimer, the term of this patent is extended or adjusted under 35 U.S.C. 154(b) by 0 days.

(21) Appl. No.: 12/019,585

(22) Filed: Jan. 24, 2008

(65) Prior Publication Data

US 2008/0212207 A1  Sep. 4, 2008

(30) Foreign Application Priority Data

Feb. 9, 2007  (JP) ............................ P2007-030912

(51) Int. Cl.
*G02B 9/12* (2006.01)
(52) U.S. Cl. ...................... 359/784; 359/764
(58) Field of Classification Search ................. 359/784, 359/785, 689, 690, 688, 687, 686, 765, 764
See application file for complete search history.

(56) References Cited

U.S. PATENT DOCUMENTS

| 5,815,323 | A  | * | 9/1998 | Abe et al. ................... 359/688 |
| 6,259,508 | B1 | * | 7/2001 | Shigematsu .................. 355/53 |
| 7,068,428 | B2 | * | 6/2006 | Misaka ........................ 359/557 |
| 7,184,225 | B1 | * | 2/2007 | Noda .......................... 359/784 |
| 7,239,458 | B2 | * | 7/2007 | Zeng ........................... 359/784 |
| 7,423,820 | B2 |   | 9/2008 | Taniyama |
| 2002/0181121 | A1 | * | 12/2002 | Kawakami ................... 359/689 |
| 2009/0015942 | A1 | * | 1/2009 | Mihara et al. ................ 359/689 |

FOREIGN PATENT DOCUMENTS

| JP | 2002-221659 A | 8/2002 |
| JP | 2004-302058 A | 10/2004 |
| JP | 2005-173319 A | 6/2005 |
| JP | 2005-227755 A | 8/2005 |
| JP | 2005-292235 A | 10/2005 |

\* cited by examiner

*Primary Examiner*—Timothy J Thompson
(74) *Attorney, Agent, or Firm*—Birch, Stewart, Kolasch & Birch, LLP

(57) ABSTRACT

An imaging lens is provided and includes: in order from an object side of the imaging lens, an aperture diaphragm; a first lens having a positive refractive power and having a convex surface on the object side; a second lens having a negative refractive power and having a concave surface on the object side; and a third lens having a meniscus shape having a convex surface on the object side in the vicinity of an optical axis thereof, each of the first lens, the second lens and the third lens having at least one aspherical surface, and the imaging lens satisfying the following conditional expressions.

$$0.9 < |f2/f| < 11 \qquad (1)$$

$$1.2 < |f3/f| < 100 \qquad (2)$$

f represents a focal length of the imaging lens; f2 represents a focal length of the second lens; and f3 represents a focal length of the third lens.

17 Claims, 21 Drawing Sheets

EXAMPLE 1

EXAMPLE 5

EXAMPLE 6

EXAMPLE 9

EXAMPLE 10

FIG. 11A

AD: APERTURE DIAPHRAGM

| EXAMPLE 1: BASIC LENS DATA | | | | |
|---|---|---|---|---|
| Si (SURFACE NUMBER) | Ri (RADIUS OF CURVATURE) | Di (SURFACE SPACING) | Ndj (REFRACTIVE INDEX) | $\nu dj$ (ABBE NUMBER) |
| 0 (AD) | — | 0.00 | — | — |
| *1 | 1.325 | 0.68 | 1.532 | 55.4 |
| *2 | 14.529 | 0.57 | | |
| *3 | -1.474 | 0.55 | 1.606 | 27 |
| *4 | -2.016 | 0.15 | | |
| *5 | 2.889 | 0.95 | 1.532 | 55.4 |
| *6 | 1.633 | 0.50 | | |
| 7 | ∞ | 0.30 | 1.516 | 64.1 |
| 8 | ∞ | 0.27 | | |

(*: ASPHERIC SURFACE)
(f=3.39, Fno.=3.2)

FIG. 11B

| EXAMPLE 1: ASPHERICAL DATA | | | |
|---|---|---|---|
| ASPHERICAL COEFFICIENT | SURFACE NUMBER | | |
| | FIRST SURFACE | SECOND SURFACE | THIRD SURFACE |
| K | 1.496E+00 | -1.003E+01 | -7.065E+00 |
| A3 | -5.736E-03 | -5.697E-03 | -1.021E-01 |
| A4 | 2.416E-02 | -7.279E-03 | -6.051E-02 |
| A5 | -2.448E-01 | -9.471E-02 | -9.866E-02 |
| A6 | 1.774E-01 | -3.290E-02 | -2.054E-01 |
| A7 | 3.150E-01 | 1.507E-01 | 6.647E-02 |
| A8 | -1.738E-01 | 9.451E-02 | 8.154E-01 |
| A9 | -8.996E-01 | -8.696E-01 | 8.824E-01 |
| A10 | 5.499E-01 | 3.590E-01 | -2.467E+00 |
| | FOURTH SURFACE | FIFTH SURFACE | SIXTH SURFACE |
| K | -1.622E+01 | -3.331E+01 | -1.072E-01 |
| A3 | -2.775E-01 | -2.708E-01 | -1.033E-01 |
| A4 | 3.270E-03 | 1.301E-03 | -1.896E-01 |
| A5 | 9.046E-02 | 1.159E-01 | 1.236E-01 |
| A6 | 1.588E-01 | 3.360E-02 | 1.366E-02 |
| A7 | 8.722E-02 | -2.739E-02 | -3.178E-02 |
| A8 | 2.595E-02 | -1.654E-02 | -3.998E-03 |
| A9 | -2.191E-02 | 7.500E-03 | 1.039E-02 |
| A10 | -7.869E-02 | -2.750E-04 | -2.811E-03 |

FIG. 12A

AD: APERTURE DIAPHRAGM

| Si (SURFACE NUMBER) | Ri (RADIUS OF CURVATURE) | Di (SURFACE SPACING) | Ndj (REFRACTIVE INDEX) | νdj (ABBE NUMBER) |
|---|---|---|---|---|
| 0 (AD) | — | -0.09 | — | — |
| *1 | 1.414 | 0.70 | 1.532 | 55.4 |
| *2 | 16.839 | 0.64 | | |
| *3 | -1.239 | 0.54 | 1.604 | 27.2 |
| *4 | -1.607 | 0.09 | | |
| *5 | 2.191 | 0.92 | 1.532 | 55.4 |
| *6 | 1.577 | 0.50 | | |
| 7 | ∞ | 0.30 | 1.516 | 64.1 |
| 8 | ∞ | 0.33 | | |

(*:ASPHERIC SURFACE)
(f=3.28, Fno.=2.8)

FIG. 12B

EXAMPLE 2: ASPHERICAL DATA

| ASPHERICAL COEFFICIENT | SURFACE NUMBER | | |
|---|---|---|---|
| | FIRST SURFACE | SECOND SURFACE | THIRD SURFACE |
| K | 1.856E+00 | -1.000E+00 | -3.122E+00 |
| A3 | -1.410E-02 | -5.692E-03 | -7.515E-02 |
| A4 | 5.010E-02 | 1.634E-03 | -4.572E-02 |
| A5 | -2.938E-01 | -1.782E-01 | -1.258E-01 |
| A6 | 1.356E-01 | 7.048E-02 | -1.923E-01 |
| A7 | 2.635E-01 | 2.457E-01 | -5.565E-02 |
| A8 | -7.068E-03 | -1.336E-01 | 5.992E-01 |
| A9 | -4.038E-01 | -9.566E-01 | 1.006E+00 |
| A10 | -2.247E-01 | 7.164E-01 | -1.839E+00 |
| | FOURTH SURFACE | FIFTH SURFACE | SIXTH SURFACE |
| K | -7.418E+00 | -1.525E+01 | -1.655E+00 |
| A3 | -2.667E-01 | -2.571E-01 | -2.528E-02 |
| A4 | -1.171E-02 | 3.285E-02 | -2.549E-01 |
| A5 | 6.402E-02 | 1.172E-01 | 1.732E-01 |
| A6 | 1.251E-01 | 6.907E-03 | 8.233E-03 |
| A7 | 6.286E-02 | -4.357E-02 | -3.879E-02 |
| A8 | 2.252E-02 | -1.039E-02 | -3.493E-03 |
| A9 | -2.640E-03 | 1.919E-02 | 1.159E-02 |
| A10 | -4.520E-02 | -4.567E-03 | -2.979E-03 |

FIG. 13A

AD: APERTURE DIAPHRAGM

| EXAMPLE 3: BASIC LENS DATA | | | | |
|---|---|---|---|---|
| Si (SURFACE NUMBER) | Ri (RADIUS OF CURVATURE) | Di (SURFACE SPACING) | Ndj (REFRACTIVE INDEX) | νdj (ABBE NUMBER) |
| 0 (AD) | — | 0.00 | — | — |
| *1 | 1.314 | 0.69 | 1.532 | 55.4 |
| *2 | 11.054 | 0.57 | | |
| *3 | -1.475 | 0.55 | 1.606 | 27 |
| *4 | -1.858 | 0.15 | | |
| *5 | 3.046 | 0.92 | 1.532 | 55.4 |
| *6 | 1.568 | 0.50 | | |
| 7 | ∞ | 0.30 | 1.516 | 64.1 |
| 8 | ∞ | 0.29 | | |

(*: ASPHERIC SURFACE)
(f=3.40, Fno.=2.8)

FIG. 13B

| EXAMPLE 3: ASPHERICAL DATA | | | |
|---|---|---|---|
| ASPHERICAL COEFFICIENT | SURFACE NUMBER | | |
| | FIRST SURFACE | SECOND SURFACE | THIRD SURFACE |
| K | 1.381E+00 | 9.391E+00 | -8.149E+00 |
| A3 | -3.918E-03 | 8.215E-03 | -8.237E-02 |
| A4 | 3.223E-02 | -4.404E-02 | -9.721E-02 |
| A5 | -2.678E-01 | -2.568E-02 | -7.986E-02 |
| A6 | 2.521E-01 | -5.481E-03 | -1.515E-01 |
| A7 | 2.998E-01 | 1.090E-01 | 7.852E-02 |
| A8 | -2.953E-01 | 1.486E-02 | 6.755E-01 |
| A9 | -7.703E-01 | -8.320E-01 | 6.848E-01 |
| A10 | 5.827E-01 | 4.939E-01 | -2.001E+00 |
| | FOURTH SURFACE | FIFTH SURFACE | SIXTH SURFACE |
| K | -1.422E+01 | -3.175E+01 | 1.304E-01 |
| A3 | -2.450E-01 | -2.474E-01 | -1.224E-01 |
| A4 | -7.892E-03 | -1.993E-02 | -1.825E-01 |
| A5 | 7.161E-02 | 1.101E-01 | 1.169E-01 |
| A6 | 1.416E-01 | 3.278E-02 | 1.487E-02 |
| A7 | 9.068E-02 | -2.403E-02 | -3.159E-02 |
| A8 | 4.145E-02 | -1.361E-02 | -3.769E-03 |
| A9 | -2.295E-02 | 7.557E-03 | 1.006E-02 |
| A10 | -7.688E-02 | -1.271E-03 | -2.723E-03 |

FIG. 14A

AD: APERTURE DIAPHRAGM

| EXAMPLE 4: BASIC LENS DATA | | | | |
|---|---|---|---|---|
| $S_i$ (SURFACE NUMBER) | $R_i$ (RADIUS OF CURVATURE) | $D_i$ (SURFACE SPACING) | $N_{dj}$ (REFRACTIVE INDEX) | $\nu_{dj}$ (ABBE NUMBER) |
| 0 (AD) | — | -0.10 | — | — |
| *1 | 1.346 | 0.70 | 1.532 | 55.4 |
| *2 | 14.195 | 0.64 | | |
| *3 | -1.054 | 0.55 | 1.604 | 27.2 |
| *4 | -2.153 | 0.07 | | |
| *5 | 1.677 | 0.96 | 1.532 | 55.4 |
| *6 | 2.143 | 0.50 | | |
| 7 | ∞ | 0.40 | 1.516 | 64.1 |
| 8 | ∞ | 0.40 | | |

(*: ASPHERIC SURFACE)

FIG. 14B (f=3.50, Fno.=2.8)

| EXAMPLE 4: ASPHERICAL DATA | | | |
|---|---|---|---|
| ASPHERICAL COEFFICIENT | SURFACE NUMBER | | |
| | FIRST SURFACE | SECOND SURFACE | THIRD SURFACE |
| K | 1.411E+00 | -1.000E+00 | -6.347E+00 |
| A3 | -6.353E-03 | 1.927E-03 | -1.069E-01 |
| A4 | 8.248E-03 | -4.900E-02 | -2.819E-01 |
| A5 | -1.203E-01 | -3.998E-02 | -1.047E-01 |
| A6 | 6.952E-02 | -4.453E-02 | -3.587E-02 |
| A7 | 6.383E-02 | 9.061E-02 | 2.197E-01 |
| A8 | -8.222E-02 | 1.089E-01 | 6.827E-01 |
| A9 | -4.237E-02 | -6.041E-01 | 5.246E-01 |
| A10 | -8.476E-02 | 1.990E-01 | -1.951E+00 |
| | FOURTH SURFACE | FIFTH SURFACE | SIXTH SURFACE |
| K | -1.695E+01 | -1.303E+01 | 3.154E-01 |
| A3 | -2.532E-01 | -1.888E-01 | 1.844E-02 |
| A4 | -9.734E-02 | -3.071E-02 | -2.551E-01 |
| A5 | 6.319E-02 | 8.139E-02 | 1.027E-01 |
| A6 | 1.677E-01 | 1.943E-02 | 2.522E-02 |
| A7 | 8.954E-02 | -2.279E-02 | -2.896E-02 |
| A8 | 2.050E-02 | -7.679E-03 | -4.583E-03 |
| A9 | -1.514E-02 | 1.087E-02 | 9.495E-03 |
| A10 | -4.993E-02 | -3.003E-03 | -2.544E-03 |

FIG. 15A

AD: APERTURE DIAPHRAGM

| Si (SURFACE NUMBER) | Ri (RADIUS OF CURVATURE) | Di (SURFACE SPACING) | Ndj (REFRACTIVE INDEX) | νdj (ABBE NUMBER) |
|---|---|---|---|---|
| 0 (AD) | — | -0.10 | — | — |
| *1 | 1.272 | 0.75 | 1.510 | 56.2 |
| *2 | 12.081 | 0.64 | | |
| *3 | -1.128 | 0.53 | 1.608 | 25.2 |
| *4 | -1.863 | 0.07 | | |
| *5 | 3.024 | 1.14 | 1.532 | 55.4 |
| *6 | 2.571 | 0.50 | | |
| 7 | ∞ | 0.40 | 1.516 | 64.1 |
| 8 | ∞ | 0.27 | | |

(*: ASPHERIC SURFACE)
(f=3.64, Fno.=2.8)

FIG. 15B

EXAMPLE 5: ASPHERICAL DATA

| ASPHERICAL COEFFICIENT | SURFACE NUMBER | | |
|---|---|---|---|
| | FIRST SURFACE | SECOND SURFACE | THIRD SURFACE |
| K | 1.349E+00 | -1.000E+00 | -5.810E+00 |
| A3 | -4.162E-03 | 4.398E-03 | -7.534E-02 |
| A4 | 5.048E-04 | -4.218E-02 | -2.744E-01 |
| A5 | -1.076E-01 | -3.708E-02 | -1.036E-01 |
| A6 | 8.249E-02 | 2.240E-02 | -4.806E-02 |
| A7 | 5.330E-02 | 5.227E-02 | 2.064E-01 |
| A8 | -9.717E-02 | 7.541E-02 | 6.620E-01 |
| A9 | -1.010E-02 | -6.390E-01 | 4.938E-01 |
| A10 | -9.062E-02 | 2.754E-01 | -2.013E+00 |
| | FOURTH SURFACE | FIFTH SURFACE | SIXTH SURFACE |
| K | -1.512E+01 | -3.903E+01 | 6.529E-01 |
| A3 | -2.361E-01 | -1.792E-01 | 3.457E-02 |
| A4 | -7.417E-02 | -2.377E-02 | -2.422E-01 |
| A5 | 6.887E-02 | 8.648E-02 | 1.029E-01 |
| A6 | 1.616E-01 | 2.202E-02 | 2.305E-02 |
| A7 | 7.944E-02 | -2.491E-02 | -2.956E-02 |
| A8 | 1.439E-02 | -7.655E-03 | -4.757E-03 |
| A9 | -1.815E-02 | 9.232E-03 | 9.572E-03 |
| A10 | -5.087E-02 | -2.280E-03 | -2.399E-03 |

FIG. 16A

AD: APERTURE DIAPHRAGM

| EXAMPLE 6: BASIC LENS DATA | | | | |
|---|---|---|---|---|
| Si (SURFACE NUMBER) | Ri (RADIUS OF CURVATURE) | Di (SURFACE SPACING) | Ndj (REFRACTIVE INDEX) | $\nu$dj (ABBE NUMBER) |
| 0 (AD) | — | -0.10 | — | — |
| *1 | 1.354 | 0.80 | 1.510 | 56.2 |
| *2 | -198.639 | 0.59 | | |
| *3 | -1.108 | 0.54 | 1.608 | 25.2 |
| *4 | -1.834 | 0.07 | | |
| *5 | 3.024 | 1.15 | 1.532 | 55.4 |
| *6 | 2.393 | 0.50 | | |
| 7 | ∞ | 0.30 | 1.516 | 64.1 |
| 8 | ∞ | 0.31 | | |

(*: ASPHERIC SURFACE)
(f=3.59, Fno.=2.8)

FIG. 16B

| EXAMPLE 6: ASPHERICAL DATA | | | |
|---|---|---|---|
| ASPHERICAL COEFFICIENT | SURFACE NUMBER | | |
| | FIRST SURFACE | SECOND SURFACE | THIRD SURFACE |
| K | 1.383E+00 | -1.000E+00 | -5.491E+00 |
| A3 | -3.214E-03 | 5.120E-03 | -8.319E-02 |
| A4 | -5.071E-03 | -7.553E-02 | -2.489E-01 |
| A5 | -1.190E-01 | -4.896E-02 | -9.795E-02 |
| A6 | 7.227E-02 | 1.530E-02 | -6.615E-02 |
| A7 | 7.716E-02 | 3.607E-02 | 1.736E-01 |
| A8 | -7.281E-02 | 5.368E-02 | 6.413E-01 |
| A9 | -2.986E-02 | -6.433E-01 | 5.257E-01 |
| A10 | -1.533E-01 | 3.344E-01 | -1.853E+00 |
| | FOURTH SURFACE | FIFTH SURFACE | SIXTH SURFACE |
| K | -1.441E+01 | -3.781E+01 | 4.712E-01 |
| A3 | -2.271E-01 | -1.748E-01 | 2.261E-02 |
| A4 | -6.681E-02 | -2.280E-02 | -2.327E-01 |
| A5 | 7.374E-02 | 8.737E-02 | 1.022E-01 |
| A6 | 1.649E-01 | 2.174E-02 | 2.374E-02 |
| A7 | 8.201E-02 | -2.555E-02 | -2.974E-02 |
| A8 | 1.575E-02 | -7.882E-03 | -4.802E-03 |
| A9 | -1.884E-02 | 9.368E-03 | 9.542E-03 |
| A10 | -5.371E-02 | -2.247E-03 | -2.414E-03 |

FIG. 17A

AD: APERTURE DIAPHRAGM

| EXAMPLE 7: BASIC LENS DATA | | | | |
|---|---|---|---|---|
| Si (SURFACE NUMBER) | Ri (RADIUS OF CURVATURE) | Di (SURFACE SPACING) | Ndj (REFRACTIVE INDEX) | $\nu$dj (ABBE NUMBER) |
| 0 (AD) | — | 0.00 | — | — |
| *1 | 1.502 | 0.66 | 1.532 | 55.4 |
| *2 | -11.090 | 0.55 | | |
| *3 | -1.339 | 0.57 | 1.606 | 27 |
| *4 | -1.663 | 0.19 | | |
| *5 | 4.671 | 1.02 | 1.532 | 55.4 |
| *6 | 1.616 | 0.50 | | |
| 7 | ∞ | 0.30 | 1.516 | 64.1 |
| 8 | ∞ | 0.23 | | |

(*: ASPHERIC SURFACE)

FIG. 17B
(f=3.39, Fno.=3.2)

| EXAMPLE 7: ASPHERICAL DATA | | | |
|---|---|---|---|
| ASPHERICAL COEFFICIENT | SURFACE NUMBER | | |
| | FIRST SURFACE | SECOND SURFACE | THIRD SURFACE |
| K | 6.194E-01 | -1.056E+01 | -8.149E+00 |
| A3 | -6.886E-03 | -1.896E-03 | -1.043E-01 |
| A4 | 3.984E-02 | -6.749E-02 | -1.803E-01 |
| A5 | -1.680E-01 | -1.261E-01 | 6.682E-02 |
| A6 | -4.878E-02 | 8.586E-02 | 3.519E-02 |
| A7 | 2.038E-01 | 1.990E-01 | 5.631E-02 |
| A8 | 8.557E-01 | -4.743E-01 | 4.051E-01 |
| A9 | -1.839E+00 | -4.851E-01 | 5.155E-01 |
| A10 | 4.423E-01 | 4.735E-01 | -1.610E+00 |
| | FOURTH SURFACE | FIFTH SURFACE | SIXTH SURFACE |
| K | -1.196E+01 | -1.210E+01 | 2.295E-01 |
| A3 | -2.325E-01 | -2.338E-01 | -1.091E-01 |
| A4 | 2.489E-02 | -2.454E-02 | -1.828E-01 |
| A5 | 9.348E-02 | 1.070E-01 | 1.180E-01 |
| A6 | 1.632E-01 | 3.060E-02 | 1.143E-02 |
| A7 | 8.178E-02 | -2.593E-02 | -2.869E-02 |
| A8 | 6.022E-02 | -1.377E-02 | -4.890E-03 |
| A9 | -2.531E-02 | 8.729E-03 | 9.841E-03 |
| A10 | -1.110E-01 | -1.123E-03 | -2.508E-03 |

FIG. 18A

AD: APERTURE DIAPHRAGM

| EXAMPLE 8: BASIC LENS DATA ||||||
| Si (SURFACE NUMBER) | Ri (RADIUS OF CURVATURE) | Di (SURFACE SPACING) | Ndj (REFRACTIVE INDEX) | νdj (ABBE NUMBER) |
| --- | --- | --- | --- | --- |
| 0 (AD) | — | -0.09 | — | — |
| *1 | 1.427 | 0.69 | 1.510 | 56.2 |
| *2 | 66.587 | 0.66 | | |
| *3 | -0.875 | 0.50 | 1.606 | 27 |
| *4 | -1.667 | 0.15 | | |
| *5 | 1.400 | 0.90 | 1.532 | 55.4 |
| *6 | 1.953 | 0.70 | | |
| 7 | ∞ | 0.30 | 1.516 | 64.1 |
| 8 | ∞ | 0.41 | | |

(*: ASPHERIC SURFACE)

FIG. 18B (f=3.49, Fno.=2.8)

| | EXAMPLE 8: ASPHERICAL DATA |||
| --- | --- | --- | --- |
| ASPHERICAL COEFFICIENT | SURFACE NUMBER |||
| | FIRST SURFACE | SECOND SURFACE | THIRD SURFACE |
| K | 1.625E+00 | 0.000E+00 | -1.224E+00 |
| A3 | -1.256E-02 | 3.128E-02 | -5.189E-02 |
| A4 | 4.357E-02 | -2.352E-01 | 6.757E-02 |
| A5 | -2.482E-01 | 4.092E-01 | -5.719E-01 |
| A6 | 1.967E-01 | -4.345E-01 | 3.346E-01 |
| A7 | 7.921E-02 | -1.899E-01 | 2.264E-01 |
| A8 | -1.633E-01 | 3.968E-01 | 2.189E-01 |
| A9 | -5.112E-02 | 5.769E-02 | 4.065E-01 |
| A10 | -9.974E-02 | -4.150E-01 | -1.165E+00 |
| | FOURTH SURFACE | FIFTH SURFACE | SIXTH SURFACE |
| K | -9.097E-01 | -8.697E+00 | -1.108E+01 |
| A3 | -1.646E-01 | -1.212E-01 | 6.946E-02 |
| A4 | -1.244E-01 | -1.239E-01 | -2.402E-01 |
| A5 | 1.885E-01 | 1.867E-01 | 1.215E-01 |
| A6 | 1.201E-01 | 6.221E-03 | 1.457E-02 |
| A7 | 7.483E-02 | -5.839E-02 | -2.772E-02 |
| A8 | -5.289E-03 | -1.235E-02 | -3.259E-03 |
| A9 | -9.029E-02 | 2.158E-02 | 7.962E-03 |
| A10 | 2.497E-02 | -4.089E-03 | -2.123E-03 |

FIG. 19A

AD: APERTURE DIAPHRAGM

| EXAMPLE 9: BASIC LENS DATA | | | | |
|---|---|---|---|---|
| Si (SURFACE NUMBER) | Ri (RADIUS OF CURVATURE) | Di (SURFACE SPACING) | Ndj (REFRACTIVE INDEX) | νdj (ABBE NUMBER) |
| 0 (AD) | — | -0.10 | — | — |
| *1 | 1.501 | 0.77 | 1.510 | 56.2 |
| *2 | 252.824 | 0.67 | | |
| *3 | -0.865 | 0.52 | 1.606 | 27 |
| *4 | -1.869 | 0.12 | | |
| *5 | 1.252 | 0.90 | 1.532 | 55.4 |
| *6 | 2.045 | 0.70 | | |
| 7 | ∞ | 0.30 | 1.516 | 64.1 |
| 8 | ∞ | 0.49 | | |

(*: ASPHERIC SURFACE)

FIG. 19B (f=3.57, Fno.=2.8)

| | EXAMPLE 9: ASPHERICAL DATA | | |
|---|---|---|---|
| ASPHERICAL COEFFICIENT | SURFACE NUMBER | | |
| | FIRST SURFACE | SECOND SURFACE | THIRD SURFACE |
| K | 1.458E+00 | 0.000E+00 | -1.593E+00 |
| A3 | -7.280E-03 | 3.043E-02 | -2.323E-02 |
| A4 | 2.153E-02 | -2.273E-01 | -3.246E-02 |
| A5 | -1.797E-01 | 3.935E-01 | -5.145E-01 |
| A6 | 1.882E-01 | -3.968E-01 | 3.548E-01 |
| A7 | 4.376E-02 | -1.814E-01 | 2.507E-01 |
| A8 | -1.929E-01 | 3.532E-01 | 1.566E-01 |
| A9 | -5.101E-02 | 3.366E-02 | 2.927E-01 |
| A10 | 3.352E-02 | -2.910E-01 | -9.144E-01 |
| | FOURTH SURFACE | FIFTH SURFACE | SIXTH SURFACE |
| K | -1.157E+00 | -7.206E+00 | -1.038E+01 |
| A3 | -1.860E-01 | -1.320E-01 | 9.166E-02 |
| A4 | -1.202E-01 | -7.970E-02 | -2.537E-01 |
| A5 | 1.842E-01 | 1.526E-01 | 1.156E-01 |
| A6 | 1.109E-01 | 2.139E-03 | 2.253E-02 |
| A7 | 5.383E-02 | -4.923E-02 | -2.589E-02 |
| A8 | -1.004E-03 | -8.418E-03 | -4.960E-03 |
| A9 | -6.007E-02 | 1.986E-02 | 6.953E-03 |
| A10 | 5.904E-03 | -4.703E-03 | -1.504E-03 |

FIG. 20A

AD: APERTURE DIAPHRAGM

| EXAMPLE 10: BASIC LENS DATA | | | | |
|---|---|---|---|---|
| Si (SURFACE NUMBER) | Ri (RADIUS OF CURVATURE) | Di (SURFACE SPACING) | Ndj (REFRACTIVE INDEX) | νdj (ABBE NUMBER) |
| 0 (AD) | — | -0.06 | — | — |
| *1 | 1.196 | 0.60 | 1.510 | 56.2 |
| *2 | 3.225 | 0.80 | | |
| *3 | -0.987 | 0.48 | 1.606 | 27 |
| *4 | -1.550 | 0.08 | | |
| *5 | 1.301 | 0.84 | 1.532 | 55.4 |
| *6 | 1.646 | 0.50 | | |
| 7 | ∞ | 0.30 | 1.516 | 64.1 |
| 8 | ∞ | 0.57 | | |

(*:ASPHERIC SURFACE)

FIG. 20B
(f=3.39, Fno.=3.0)

| EXAMPLE 10: ASPHERICAL DATA | | | |
|---|---|---|---|
| ASPHERICAL COEFFICIENT | SURFACE NUMBER | | |
| | FIRST SURFACE | SECOND SURFACE | THIRD SURFACE |
| K | 1.962E+00 | 1.135E+01 | -1.685E+00 |
| A3 | 8.043E-03 | 2.247E-02 | -6.623E-02 |
| A4 | -4.939E-02 | -2.777E-02 | 1.115E-01 |
| A5 | -8.557E-02 | 1.276E-01 | -2.074E-01 |
| A6 | 1.269E-01 | 1.229E-01 | -2.657E-01 |
| A7 | 1.399E-01 | -3.209E-01 | -2.257E-01 |
| A8 | -1.587E-01 | 2.748E-01 | 6.588E-01 |
| A9 | -8.762E-01 | -7.432E-01 | 1.160E+00 |
| A10 | 7.848E-01 | 1.217E+00 | -1.452E+00 |
| | FOURTH SURFACE | FIFTH SURFACE | SIXTH SURFACE |
| K | -7.142E+00 | -3.386E+00 | -6.403E+00 |
| A3 | -2.766E-01 | -2.248E-01 | 6.714E-02 |
| A4 | 8.283E-03 | 2.298E-03 | -2.416E-01 |
| A5 | -1.934E-02 | 8.106E-02 | 1.323E-01 |
| A6 | 7.339E-02 | 1.836E-02 | -9.857E-04 |
| A7 | 3.393E-02 | -2.673E-02 | -1.742E-02 |
| A8 | 5.247E-02 | -7.981E-03 | -6.705E-03 |
| A9 | 4.149E-02 | 6.934E-03 | 8.836E-03 |
| A10 | -6.128E-02 | -7.344E-04 | -2.167E-03 |

FIG. 21
| | CONDITIONAL EXPRESSION (1) $|f2/f|$ | CONDITIONAL EXPRESSION (2) $|f3/f|$ | CONDITIONAL EXPRESSION (3) $|f1/f2|$ | CONDITIONAL EXPRESSION (4) $\nu1-\nu2$ |
|---|---|---|---|---|
| EXAMPLE 1 | 4.34 | 2.83 | 0.18 | 28.4 |
| EXAMPLE 2 | 6.08 | 6.74 | 0.14 | 28.2 |
| EXAMPLE 3 | 7.60 | 2.28 | 0.11 | 28.4 |
| EXAMPLE 4 | 1.20 | 2.42 | 0.65 | 28.2 |
| EXAMPLE 5 | 1.78 | 68.32 | 0.42 | 31 |
| EXAMPLE 6 | 1.79 | 16.26 | 0.41 | 31 |
| EXAMPLE 7 | 10.06 | 1.55 | 0.07 | 28.4 |
| EXAMPLE 8 | 1.14 | 1.70 | 0.71 | 29.2 |
| EXAMPLE 9 | 0.92 | 1.22 | 0.90 | 29.2 |
| EXAMPLE 10 | 1.95 | 1.87 | 0.51 | 29.2 |
EXAMPLE 1
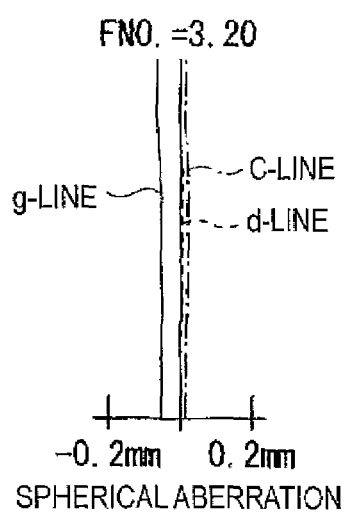
FIG. 22A
SPHERICAL ABERRATION
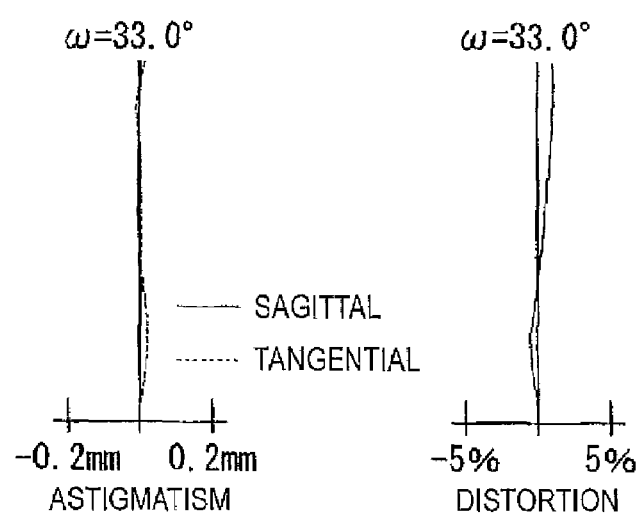
FIG. 22B
ASTIGMATISM
FIG. 22C
DISTORTION

EXAMPLE 2

SPHERICAL ABERRATION

ASTIGMATISM

DISTORTION

EXAMPLE 3

SPHERICAL ABERRATION

ASTIGMATISM

DISTORTION

EXAMPLE 4

FNO.=2.80 g-LINE, C-LINE, d-LINE

-0.2mm  0.2mm
SPHERICAL ABERRATION

ω=31.9°

—— SAGITTAL
······ TANGENTIAL

-0.2mm  0.2mm
ASTIGMATISM

ω=31.9°

-5%  5%
DISTORTION

EXAMPLE 5

FNO.=2.80 d-LINE, g-LINE, C-LINE

-0.2mm  0.2mm
SPHERICAL ABERRATION

ω=30.8°

—— SAGITTAL
······ TANGENTIAL

-0.2mm  0.2mm
ASTIGMATISM

ω=30.8°

-5%  5%
DISTORTION

EXAMPLE 6

SPHERICAL ABERRATION

ASTIGMATISM

DISTORTION

EXAMPLE 7

SPHERICAL ABERRATION

ASTIGMATISM

DISTORTION

EXAMPLE 8

EXAMPLE 9

EXAMPLE 10

SPHERICAL ABERRATION

ASTIGMATISM

DISTORTION

IMAGING LENS

BACKGROUND OF THE INVENTION

1. Field of the Invention

The present invention relates to an imaging lens having a fixed focal point, which is suitable for being incorporated into a digital camera using an imaging element, such as a CCD (Charge-Coupled Device) or CMOS (Complementary Metal Oxide Semiconductor), or a compact imaging device such as a camera using a silver film.

2. Description of Related Art

In step with recent popularization of personal computers into ordinary households, a digital still camera capable of inputting image information, such as a captured landscape or portrait, into a personal computer (hereinafter simply called a "digital camera") has become quickly widespread. Moreover, there is an increase in the number of cases where a portable cellular phone is equipped with a module camera (a portable module camera) for inputting an image.

An imaging element, such as CCD or CMOS, is used in these imaging devices. With a progress in miniaturization of the imaging elements, there is a demand for miniaturization of an overall imaging device and an imaging element incorporated into the imaging device. Simultaneously, the number of pixels in an imaging element is also on the increase, and higher resolution and performance of the imaging lens are demanded.

Accordingly, JP-A-2002-221659, JP-A-2004-302058, JP-A-2005-173319, JP-A-2005-227755 and JP-A-2005-292235 describe imaging lenses, each of which is built from three lenses and which utilizes aspheric surfaces for lens surfaces. For example, in JP-A-2005-292235, an attempt is made to achieve a further reduction in size and higher performance by means of arranging three lenses; namely, in order from the object side, a positive first lens, a negative second lens, and a negative third lens; setting refractive power of the second lens and the third lens to comparatively strong powers; and providing each of the lens surfaces with at least one aspheric surface.

As mentioned above, progress has recently been made in miniaturizing an imaging element and increasing the number of pixels thereof. With the progress, higher resolution performance and further miniaturization of a configuration are requested particularly of an imaging lens for use in a digital camera. Although primary demands for an imaging lens for use in a portable module camera have hitherto been cost and miniaturization, there is recently a tendency toward an increase in the number of pixels of an imaging element even in connection with the portable module camera, and a demand for higher performance of the imaging lens is also increasing.

Therefore, development of a wide variety of lenses which are generally enhanced in terms of cost, imaging performance, and compactness is desired. For instance, development of a low-cost, high-performance imaging lens which ensures compactness enabling incorporation into a portable module camera with an eye toward incorporation into a digital camera in terms of performance are desired.

In order to meet the demands, an example conceivable measure is to adopt three or four lenses with a view toward miniaturization and cost reduction and to actively use an aspheric surface in order to enhance performance. In this case, an aspheric surface contributes to miniaturization and enhancement of performance but is disadvantageous in terms of ease of manufacture and likely to induce an increase in cost. Hence, it is desirable to taken into sufficient consideration ease of manufacture at the time of use of the aspherical surface. The lenses described in the documents mentioned above adopt a configuration where three or four aspherical surfaces are used. However, in terms of achievement of both imaging performance and compactness, the configuration is insufficient. Moreover, by means of adoption of a four-lens configuration, performance can be enhanced when compared with the three-lens configuration, but the four-lens configuration is likely to become disadvantageous in terms of cost and compactness.

SUMMARY OF THE INVENTION

An object of an illustrative, non-limiting embodiment of the invention is to provide an imaging lens which exhibits high imaging performance with a compact configuration.

According to an aspect of the invention, there is provided an imaging lens including: an aperture diaphragm; a first lens having a positive refractive power and having a convex surface on the object side; a second lens having a negative refractive power and having a concave surface on the object side; and a third lens having a meniscus shape having a convex surface on the object side in the vicinity of an optical axis thereof, each of the first lens, the second lens and the third lens having at least one aspherical surface, and satisfying conditional expressions:

$$0.9 < |f2/f| < 11 \quad (1)$$

$$1.2 < |f3/f| < 100 \quad (2)$$

where f represents a focal length of the imaging lens; f2 represents a focal length of the second lens; and f3 represents a focal length of the third lens.

According to an aspect of the present invention, an imaging lens has a lens configuration having the small number of lenses, three lenses as a whole, and the shapes of the respective lenses and the layout of the aperture diaphragm are appropriately set. Further, distribution of power (refractive power) of the respective lenses is optimized by means of satisfying the conditional expression (1) and the conditional expression (2). Accordingly, high aberration performance is maintained while the entire length of the lens is maintained shortly.

In an imaging lens according to an aspect of the present invention, the following conditional expression may be satisfied. As a result, the lens becomes advantageous to shorten the entirety of the lens and correct various aberrations.

$$0.05 < |f1/f2| < 1.0 \quad (3)$$

where f1 represents a focal length of the first lens

In an imaging lens according to an aspect of the present invention, the following conditional expression may be satisfied. As a result, the lens becomes advantageous to correct a chromatic aberration.

$$v1 - v2 > 20 \quad (4)$$

where v1 represents an Abbe number of the first lens at the d-line, and v2 represents an Abbe number of the second lens at the d-line.

In an imaging lens according to an aspect of the present invention, the second lens may have a meniscus shape in the vicinity of the optical axis. As a result, the lens becomes advantageous in terms of miniaturization and achievement of higher performance.

In an imaging lens according to an aspect the present invention, the third lens may have a negative refractive power in the vicinity of the optical axis. As a result, sufficient back focus becomes easy to be ensured.

BRIEF DESCRIPTION OF THE DRAWINGS

The features of the invention will appear more fully upon consideration of the exemplary embodiment of the invention, which are schematically set forth in the drawings, in which:

FIG. 11 is a view showing lens data pertaining to the imaging lens of Example 1 of the present invention, wherein FIG. 11A shows basic lens data and FIG. 11B shows lens data pertaining to an aspherical surface;

FIG. 12 is a view showing lens data pertaining to the imaging lens of Example 2 of the present invention, wherein FIG. 12A shows basic lens data and FIG. 12B shows lens data pertaining to an aspherical surface;

FIG. 13 is a view showing lens data pertaining to the imaging lens of Example 3 of the present invention, wherein FIG. 13A shows basic lens data and FIG. 13B shows lens data pertaining to an aspherical surface;

FIG. 14 is a view showing lens data pertaining to the imaging lens of Example 4 of the present invention, wherein FIG. 14A shows basic lens data and FIG. 14B shows lens data pertaining to an aspherical surface;

FIG. 15 is a view showing lens data pertaining to the imaging lens of Example 5 of the present invention, wherein FIG. 15A shows basic lens data and FIG. 15B shows lens data pertaining to an aspherical surface;

FIG. 16 is a view showing lens data pertaining to the imaging lens of Example 6 of the present invention, wherein FIG. 16A shows basic lens data and FIG. 16B shows lens data pertaining to an aspherical surface;

FIG. 17 is a view showing lens data pertaining to the imaging lens of Example 7 of the present invention, wherein FIG. 17A shows basic lens data and FIG. 17B shows lens data pertaining to an aspherical surface;

FIG. 18 is a view showing lens data pertaining to the imaging lens of Example 8 of the present invention, wherein FIG. 18A shows basic lens data and FIG. 18B shows lens data pertaining to an aspherical surface;

FIG. 19 is a view showing lens data pertaining to the imaging lens of Example 9 of the present invention, wherein FIG. 19A shows basic lens data and FIG. 19B shows lens data pertaining to an aspherical surface;

FIG. 20 is a view showing lens data pertaining to the imaging lens of Example 10 of the present invention, wherein FIG. 20A shows basic lens data and FIG. 20B shows lens data pertaining to an aspherical surface;

FIG. 21 is a view collectively showing values pertaining to conditional expressions according to each of Examples;

FIG. 22 is an aberration diagram showing various aberrations of the imaging lens of Example 1 of the present invention, wherein FIG. 22A shows a spherical aberration, FIG. 22B shows astigmatism, and FIG. 22C shows distortion;

FIG. 23 is an aberration diagram showing various aberrations of the imaging lens of Example 2 of the present invention, wherein

FIG. 24 is an aberration diagram showing various aberrations of the imaging lens of Example 3 of the present invention, wherein

FIG. 25 is an aberration diagram showing various aberrations of the imaging lens of Example 4 of the present invention, wherein

FIG. 26 is an aberration diagram showing various aberrations of the imaging lens of Example 5 of the present invention, wherein

FIG. 27 is an aberration diagram showing various aberrations of the imaging lens of Example 6 of the present invention, wherein

FIG. 28 is an aberration diagram showing various aberrations of the imaging lens of Example 7 of the present invention, wherein

FIG. 29 is an aberration diagram showing various aberrations of the imaging lens of Example 8 of the present invention, wherein

FIG. 30 is an aberration diagram showing various aberrations of the imaging lens of Example 9 of the present invention, wherein FIG. 31 is an aberration diagram showing various aberrations of the imaging lens of Example 10 of the present invention, wherein

DETAILED DESCRIPTION OF THE EXEMPLARY EMBODIMENTS

Although the invention will be described below with reference to exemplary embodiments thereof, the following exemplary embodiments and modifications do not restrict the invention.

According to an exemplary embodiment of the present invention, an imaging lens has a lens configuration having the small number of lenses, three lenses as a whole, and the shapes of the respective lenses and the layout of the aperture diaphragm are appropriately set, and further the specific conditional expressions are satisfied. Consequently, a lens system of compact configuration exhibiting high aberration performance can be implemented.

Exemplary embodiments of the present invention will be described in detail hereunder by reference to the drawings.

Figure 1:
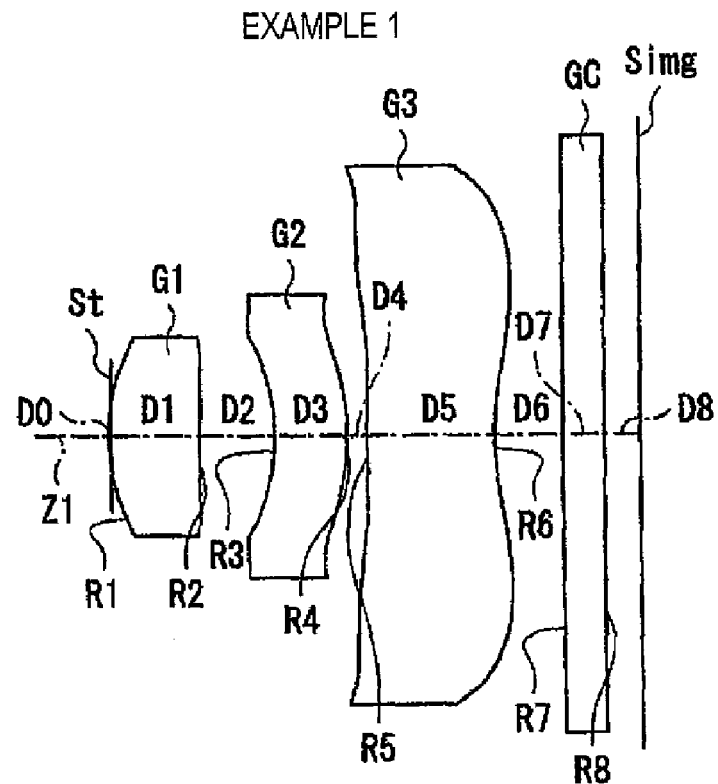
FIG. 1 is a lens cross-sectional view conforming to an imaging lens of Example 1 of the present invention.
Figure 2:
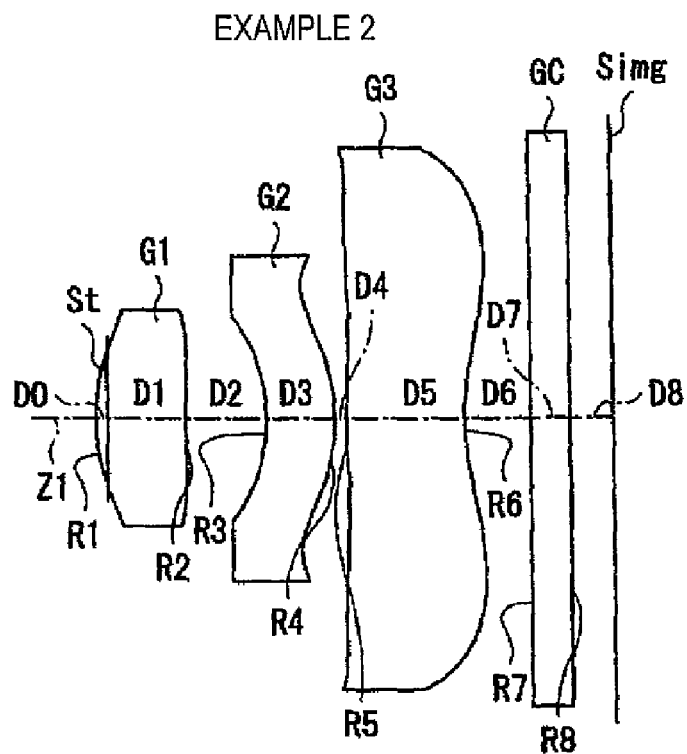
FIG. 2 is a lens cross-sectional view conforming to an imaging lens of Example 2 of the present invention.
Figure 3:
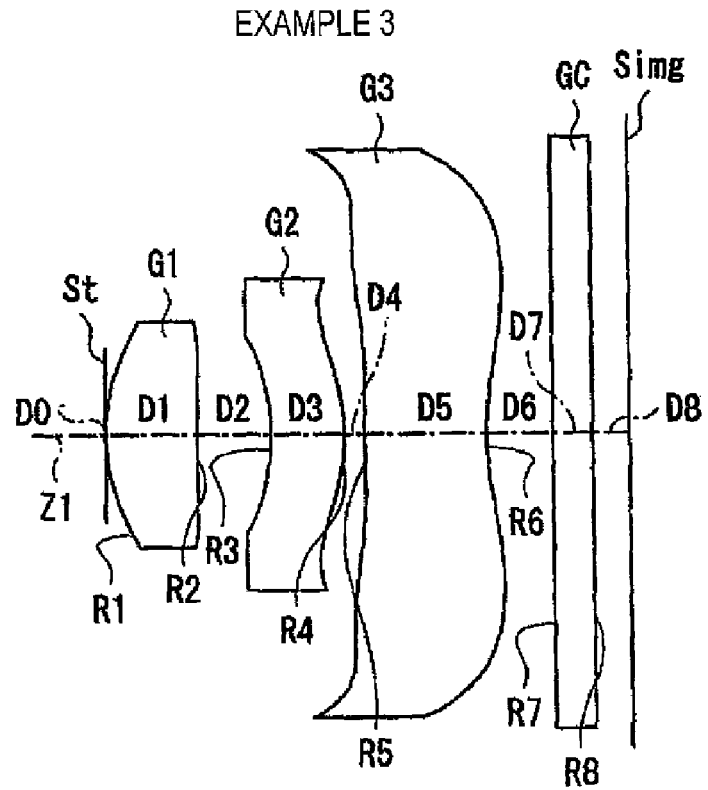
FIG. 3 is a lens cross-sectional view conforming to an imaging lens of Example 3 of the present invention.
Figure 4:
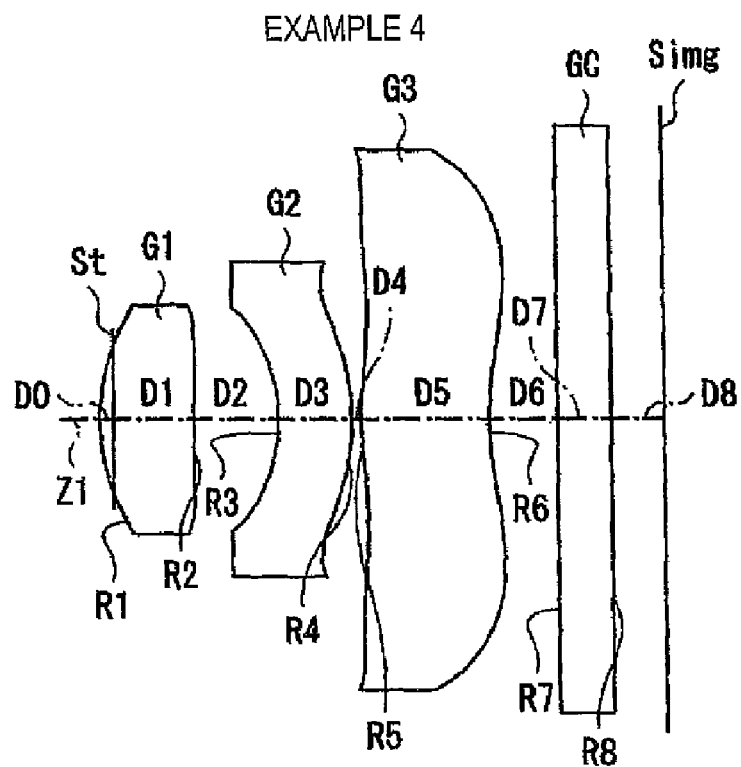
FIG. 4 is a lens cross-sectional view conforming to an imaging lens of Example 4 of the present invention.
Figure 5:
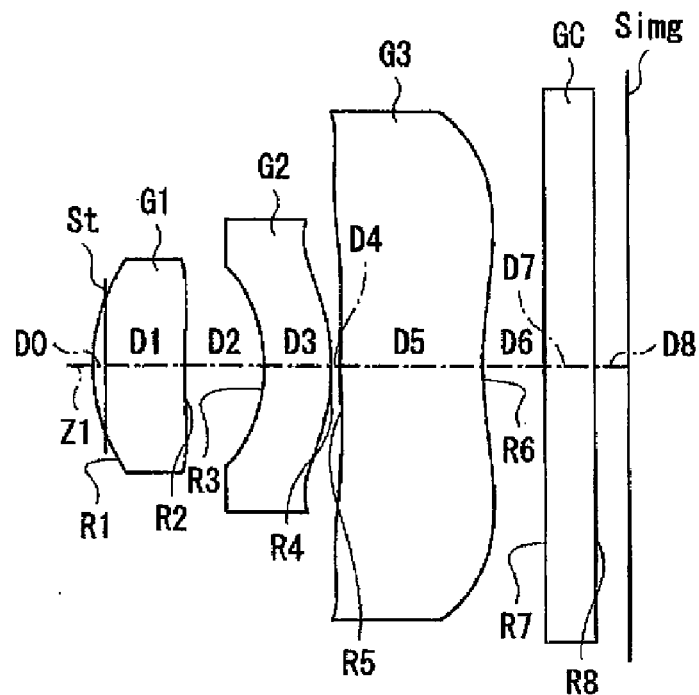
FIG. 5 is a lens cross-sectional view conforming to an imaging lens of Example 5 of the present invention.
Figure 6:
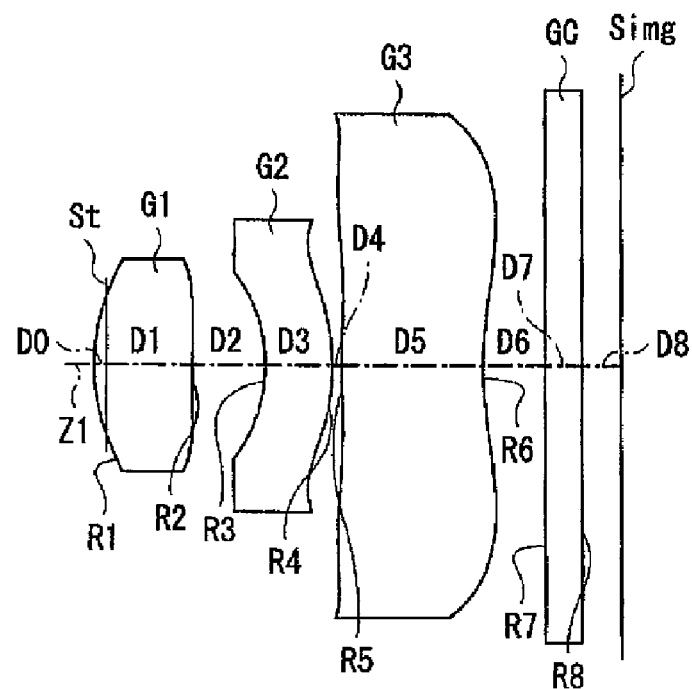
FIG. 6 is a lens cross-sectional view conforming to an imaging lens of Example 6 of the present invention.
Figure 7:
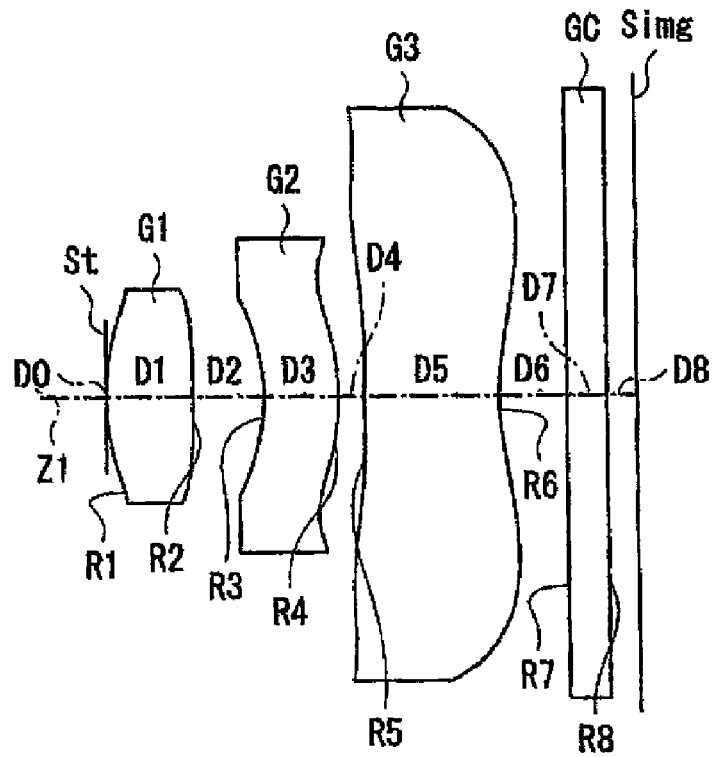
FIG. 7 is a lens cross-sectional view conforming to an imaging lens of Example 7 of the present invention.
Figure 8:
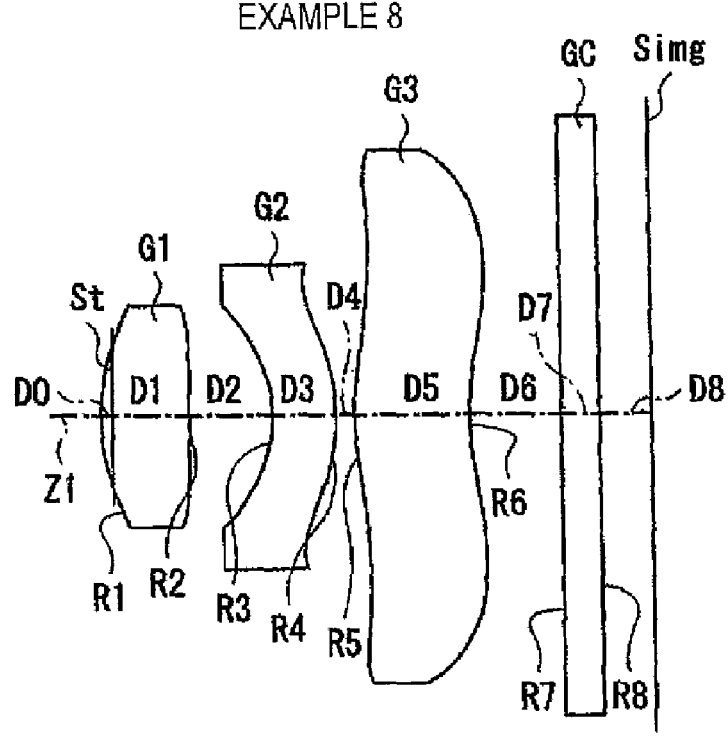
FIG. 8 is a lens cross-sectional view conforming to an imaging lens of Example 8 of the present invention.
Figure 9:
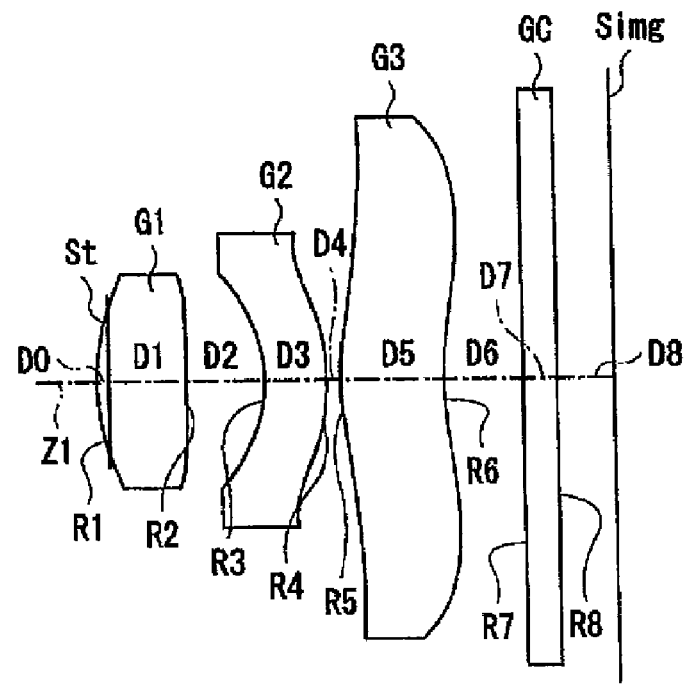
FIG. 9 is a lens cross-sectional view conforming to an imaging lens of Example 9 of the present invention.
Figure 10:
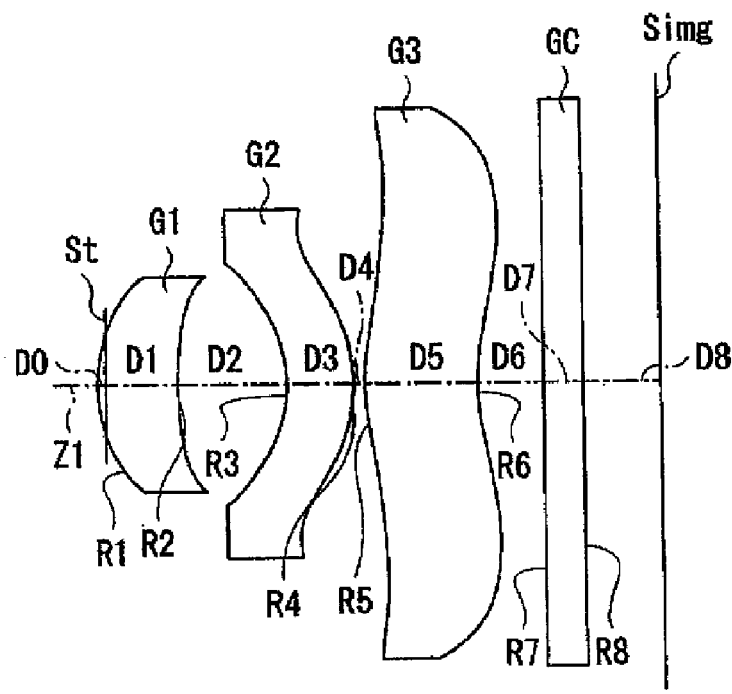
FIG. 10 is a lens cross-sectional view conforming to an imaging lens of Example 10 of the present invention.

FIG. 1 shows a first configuration example of an imaging lens serving as an embodiment of the present invention. The configuration example corresponds to a lens configuration of a first numerical example (FIGS. 11A and 11B) to be described later. Moreover, FIG. 2 shows a second configuration example and corresponds to a lens configuration of a second numerical example (FIGS. 12A and 12B) to be described later. FIG. 3 shows a third configuration example and corresponds to a lens configuration of a third numerical example (FIGS. 13A and 13B) to be described later. FIG. 4 shows a fourth configuration example and corresponds to a lens configuration of a fourth numerical example (FIGS. 14A and 14B) to be described later. FIG. 5 shows a fifth configuration example and corresponds to a lens configuration of a fifth numerical example (FIGS. 15A and 15B) to be described later. FIG. 6 shows a sixth configuration example and corresponds to a lens configuration of a sixth numerical example (FIGS. 16A and 16B) to be described later. FIG. 7 shows a seventh configuration example and corresponds to a lens configuration of a seventh numerical example (FIGS. 17A and 17B) to be described later. FIG. 8 shows a eighth configuration example and corresponds to a lens configuration of an eighth numerical example (FIGS. 18A and 18B) to be described later. FIG. 9 shows a ninth configuration example and corresponds to a lens configuration of a ninth numerical example (FIGS. 19A and 19B) to be described later. FIG. 10 shows a tenth configuration example and corresponds to a lens configuration of a tenth numerical example (FIGS. 20A and 20B) to be described later. In FIGS. 1 through 10, reference symbol Ri designates the radius of curvature of the i-the plane when reference numerals are assigned so as to gradually increase with increasing proximity to an image side (an imaging side). Reference symbol Di designates on-axis surface spacing between the i-th plane and the (i+1)-th plane along an optical axis Z1. Since the respective configurations are identical to each other in terms of a basic configuration, descriptions will be provided below by means of taking, as a basic, the configuration example of the imaging lens shown in FIG. 1.

The imaging lens is suitable for use in various pieces of imaging equipment using imaging elements, such as a CCD, CMOS, or the like; for example, a portable module camera, a digital still camera, a camera-equipped portable cellular phone, an information portable terminal, and the like. The imaging lens has, in order from the object side, an aperture diaphragm St, a first lens G1, a second lens G2, and a third lens G3 along an optical axis Z1. At least one surface of each of the first lens G1, the second lens G2, and the third lens G3 is formed into the shape of an aspherical surface.

The aperture diaphragm St is an optical aperture stop and placed closer to the object side than an image-side surface of the first lens G1. In order to ensure telecentricity; specifically, that an angle of incidence of a principal ray on the imaging element becomes nearly parallel to an optical axis (the angle of incidence achieved on an image-formation plane comes closely to zero with respect to the normal to the image-formation plane), the aperture diaphragm may be placed as closely to the object side as much as possible. In the configuration example shown in FIG. 1, the aperture diaphragm St is placed on the front side of the first lens G1; namely, at a position in a lens system most closely to the object side. However, in configuration examples shown in FIGS. 2, 4 through 6, and 8 through 10, the aperture diaphragm St is placed on at a position closer to an image side than an object-side plane apex position of the first lens G1.

An imaging element, such as a CCD, is placed on an image-forming plane Simg of the imaging lens. According to the configuration of a camera to which the lens is attached, various optical members GC; for example, flat optical members such as a cover glass for protecting an imaging plane or an infrared cut-off filter, are interposed between the third lens G3 and the imaging element.

The first lens G1 has a positive refractive power. The first lens G1 has a shape in which a convex surface is directed toward the object side in the vicinity of the optical axis. In the configuration example shown in FIG. 1, the first lens G1 has a positive meniscus shape in which a convex surface is directed toward the object side in the vicinity of the optical axis. However, as in the case of the configuration examples shown in FIGS. 6 and 7, the first lens has a biconvex shape in the vicinity of the optical axis. Further, in the configuration example shown in FIG. 1, the image-side surface has a convex shape toward the image side at the peripheral portion. However, in a configuration example shown in FIG. 10, the image-side surface has a concave shape at the peripheral portion. In the configuration example shown in FIG. 10, the lens has a meniscus shape as a whole.

The second lens G2 has a negative refractive power. The second lens G2 has a shape in which a concave surface is directed toward the object side in the vicinity of the optical axis. The second lens G2 may have a meniscus shape in the vicinity of the optical axis.

The third lens G3 has a meniscus shape in which a convex surface is directed toward the object side in the vicinity of the optical axis. The refractive power of the third lens G3 may be positive or negative. As in the case of the configuration example shown in FIG. 1, the third lens may have a negative refractive power in the vicinity of the optical axis. Alternatively, as in the case of the configuration examples shown in FIGS. 4 and 8 through 10, when the lens has a positive refractive power in the vicinity of the optical axis, the refractive power may be weakened.

The image-side surface of the third lens G3 may have an aspherical shape having at least one point of inflection. In the configuration example shown in FIG. 1, the image-side surface of the third lens G3 has a concave shape toward the image side in the vicinity of the optical axis and further has one point of inflection so as to have a convex shape toward the image side at the peripheral portion. In the meantime, the object-side surface of the third lens G3 may have at least two points of inflection. In the configuration example shown in FIG. 1, the object-side surface of the third lens has a convex shape toward the object side in the vicinity of the optical axis and further has two points of inflection so as to have a convex shape, a concave shape, and a convex shape toward the object side from the vicinity of the optical axis to the peripheral portion.

The imaging lens satisfies the following conditional expressions. In the present embodiment, the refractive power of the second lens G2 and that of the third lens G3 become weaker than the refractive power of an imaging lens in the background art (JP-A-2005-292235). Reference symbol f designates a focal length of the entire system; f2 designates a focal length of the second lens G2; and f3 designates a focal length of the third lens G3.

$$0.9 < |f2/f| < 11 \tag{1}$$

$$1.2 < |f3/f| < 100 \tag{2}$$

The imaging lens may satisfy a conditional expression below.

$$0.05 < |f1/f2| < 1.0 \tag{3}$$

where f1 designates a focal length of the first lens.

The imaging lens may satisfy a conditional expression below, where ν1 designates an Abbe number of the first lens G1 at the d-line, and ν2 designates an Abbe number f the second lens G2 at the d-line.

$$\nu 1 - \nu 2 > 20 \tag{4}$$

Operation and advantages of the imaging lens of the present embodiment configured as mentioned above will now be described.

According to an exemplary embodiment of the present invention, an imaging lens has a lens configuration having the small number of lenses, three lenses as a whole, and the shapes of the respective lenses and the layout of the aperture diaphragm are appropriately set, and further the specific conditional expressions are satisfied. Consequently, high aberration performance is maintained while an attempt is being made to shorten the entire length of the lens. Moreover, the aperture diaphragm St at a position closer to the object side than the image-side surface of the first lens G1 can be placed, whereby the lens becomes advantageous to shorten the entire length of the imaging lens and assure telecentricity. In general, telecentricity is required to address a high-performance imaging element, and therefore placing the aperture diaphragm St as mentioned above becomes advantageous to achieve further miniaturization and higher performance.

When compared with the first lens G1 and the second lens G2, the third lens G3 separates a light flux for each angle of view. Therefore, the image-side surface of the third lens G3 that is the closest to the imaging element is formed so as to become convex toward the image side in the vicinity of the optical axis and convex toward the image side at the peripheral portion, whereby an aberration is appropriately corrected at an each angle of view and an angle of incidence of a light flux into the imaging element is controlled so as to come to a given angle or less. Accordingly, unevenness in the amount of light achieved over the entire image-formation plane can be lessened, which in turn becomes advantageous to correct a field curvature, distortion, or the like.

Further, the object-side surface of the third lens G3 is formed so as to become convex toward the object side in the vicinity of the optical axis and at least two points of inflection from the vicinity of the optical axis to the peripheral portion thereof, to thus become advantageous to correct a field curvature, or the like. An aspherical surface is appropriately used in the third lens G3, so as to make the lens advantageous to correct a field curvature or the like and ensure telecentricity.

The third lens G3 is set so as to exhibit a weak positive refractive power or negative refractive power in the vicinity of the optical axis, thereby becoming advantageous to ensure back focus. When the third lens G3 exhibits a strong positive refractive power, difficulty is encountered in ensuring sufficient back focus. Specific operation and working effects of respective conditional expressions provided below will be described.

The conditional expression (1) relates to a focal length f2 of the second lens G2. When the upper limit defined by the conditional expression is surpassed, the power of the second lens G2 becomes excessively small, which in turn poses difficulty in shortening the entire length of the lens. In the meantime, when the lower limit is crossed downwardly, difficulty is encountered in correcting a field curvature and astigmatism. Therefore, a value outside the numerical range is not preferable.

The conditional expression (2) relates to a focal length f3 of the third lens G3. When there is a value outside the numerical range defined by the conditional expression, balanced power between the second lens G2 and the third lens G3 is lost, and difficulty is encountered in correcting aberrations while the entire length of the lens is maintained shortly. Therefore, a value outside the numerical range is not preferable.

The conditional expression (3) relates to a focal length f1 of the first lens G1 and the focal length f2 of the second lens G2. When the upper limit defined by the expression is surpassed, difficulty is encountered in shortening the entire length of the lens and correcting a field curvature, astigmatism, and the like. In the meantime, when the lower limit is crossed downwardly, the power of the first lens G1 becomes excessively strong, which in turn incurs an increase in a spherical aberration and renders assurance of a back focus difficult. Hence, a value outside the numerical range is not preferable.

The conditional expression (4) relates to the Abbe number ν1 of the first lens G1 and an Abbe number ν2 of the second lens G2. When the lower limit defined by the expression is crossed downwardly, difficulty is encountered in well correcting a chromatic aberration.

As described above, the imaging lens of the present embodiment is arranged to attempt optimization of the shapes, materials, and the refractive power of the respective lenses with a lens configuration having the small number of lenses, three lenses, and satisfying the predetermined conditional expressions. Hence, a lens system which has a compact configuration and which is capable of maintaining high aberration performance.

Next, specific numerical examples of the imaging lens of the present embodiment will be described. First through tenth numerical examples will be collectively described.

FIGS. 11A and 11B show, as Example 1, specific lens data corresponding to the configuration of the imaging lens shown in FIG. 1. FIG. 11A especially shows basic lens data, and FIG. 11B shows data pertaining to aspherical shapes. The i-th surface ("i"=0 through 8)—which is assigned a reference symbol so as to gradually increase with increasing proximity to the image side on condition that the aperture diaphragm St is taken as 0th—is provided in the field of the surface number Si in the lens data shown in FIG. 11A. The column of the radius of curvature Ri shows values of radius of curvature of the i-th surface from the object side in correspondence with the reference symbol Ri shown in FIG. 1. Likewise, the column of surface spacing Di also shows on-axis surface spacing (mm) between the i-th surface Si from the object side and the (i+1)-th surface Si+1 from the object side along the optical axis. The column of Ndj shows a value of refractive index of the j-th optical element (j=1 through 4) from the object side at the d-line (587.6 nm). The column of νdj shows a value of an Abbe number of the j-th optical element from the object side at the d-line. FIG. 11A also shows, as various sets of data, a paraxial focal length "f" (mm) of the entire system and a value of an F number (FNO.).

In the imaging lens of Example 1, all of both faces of the first tens G1, the second lens G2, and the third lens G3 are aspherical surfaces. Basic lens data shown in FIG. 11A show numerical values of radii of curvature in the vicinity of the optical axis as radii of curvature of the aspherical surfaces. In numerical values of the aspherical data shown in FIG. 11B, symbol E shows that a numerical value subsequent to the symbol is an exponent which takes 10 as a base and that a numeral expressed by an exponential function taking t10 as a base is multiplied by a numeral preceding E. For instance, 1.0E–02 shows that $1.0 \times 10^{-2}$.

Values of respective coefficients $A_n$ and K in the expression of the aspherical shape expressed by a following expression (A) are provided as aspherical data. In more detail, reference symbol Z designates the length (mm) of the normal to a tangential plane (a plane normal to an optical axis Z1) of an apex of an aspherical surface from a point on the aspherical surface situated at a height "h" from the optical axis Z1. In the imaging lens of Example 1, the respective aspherical surfaces are represented by effectively using the third-order coefficient $A_3$ to the tenth-order coefficient $A_{10}$ as the aspherical coefficient $A_n$.

$$Z = C \cdot h^2 / \{1 + (1 - K \cdot C^2 \cdot h^2)^{1/2}\} + \Sigma A_n \cdot h^n \qquad (A)$$

Z: Depth (mm) of an aspherical surface h: Distance (height) (mm) from an optical axis to a lens surface
K: Eccentricity
C: Paraxial curvature=1/R
(R: Paraxial radius of curvature)
$A_n$: Aspherical coefficient of the $n^{th}$ order As in the case of the imaging lens of Example 1, specific lens data corresponding to the configuration of the imaging lens shown in FIG. 2 are shown as Example 2 in FIGS. 12A and 12B. Likewise, specific lens data corresponding to the configuration of the imaging lens shown in FIG. 3 are shown as Example 3 in FIGS. 13A and 13B. Moreover, specific lens data corresponding to the configuration of the imaging lens shown in FIG. 4 are shown as Example 4 in FIGS. 14A and 14B. Likewise, specific lens data corresponding to the configuration of the imaging lens shown in FIG. 5 are shown as Example 5 in FIGS. 15A and 15B. Further, specific lens data corresponding to the configuration of the imaging lens shown in FIG. 6 are shown as Example 6 in FIGS. 16A and 16B. Moreover, specific lens data corresponding to the configuration of the imaging lens shown in FIG. 7 are likewise shown as Example 7 in FIGS. 17A and 17B. Likewise, specific lens data corresponding to the configuration of the imaging lens shown in FIG. 8 are shown as Example 8 in FIGS. 18A and 18B. Further, specific lens data corresponding to the configuration of the imaging lens shown in FIG. 9 are shown as Example 9 in FIGS. 19A and 19B. Likewise, specific lens data corresponding to the configuration of the imaging lens shown in FIG. 10 are shown as Example 10 in FIGS. 20A and 20B. In any of the imaging lenses of the second through tenth embodiments, both faces of all of the first, second, and third lenses G1, G2, and G3 assume an aspherical shape, as in the case of Example 1.

FIG. 21 collectively shows values conforming to the conditional expressions according to the respective Examples. As shown in FIG. 21, all of the values of the respective Examples fall within the numerical ranges defined by the conditional expressions.

FIGS. 22A to 22C show spherical aberration, astigmatism, and distortion of the imaging lens of Example 1. Each of aberration diagrams shows aberration acquired when d-line is taken as a reference wavelength. Spherical aberration diagrams also show aberrations at the g-line (a wavelength of 435.8 nm) and the C-line (a wavelength of 656.3 nm). In astigmatism diagrams, a solid line shows aberration in a sagittal direction, and a broken line shows aberration in a tangential direction. Reference symbol FNO. designates an F/number; and ω designates a half angle of view.

Figure 23A:
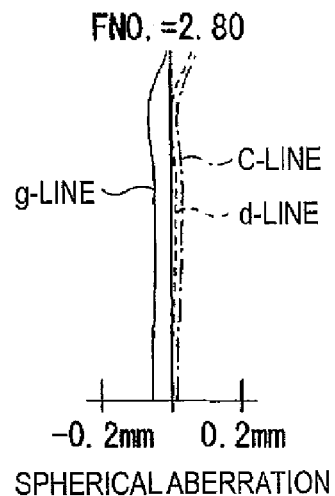
FIG. 23A shows a spherical aberration.
Figure 23B:
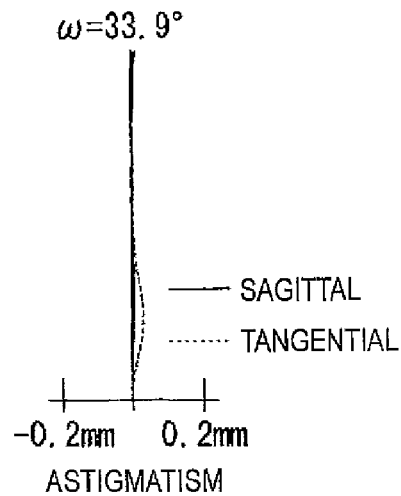
FIG. 23B shows astigmatism.
Figure 23C:
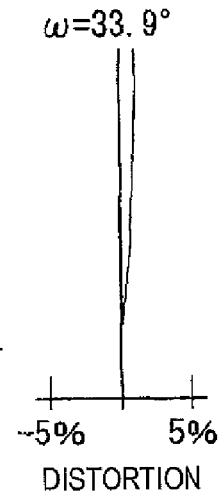
FIG. 23C shows distortion.
Figure 24A:
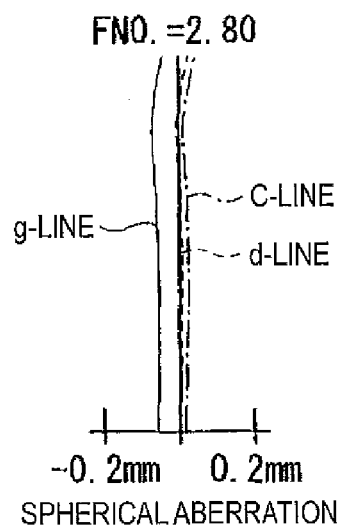
FIG. 24A shows a spherical aberration.
Figure 24B:
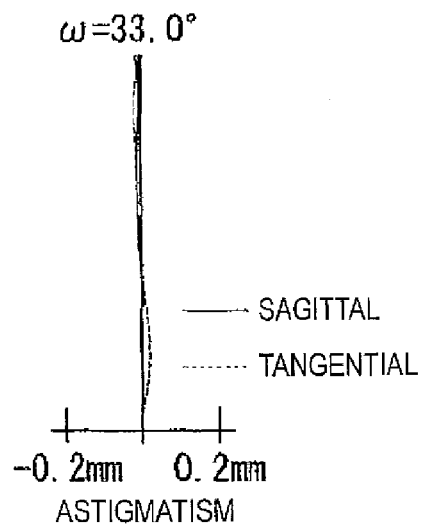
FIG. 24B shows astigmatism.
Figure 24C:
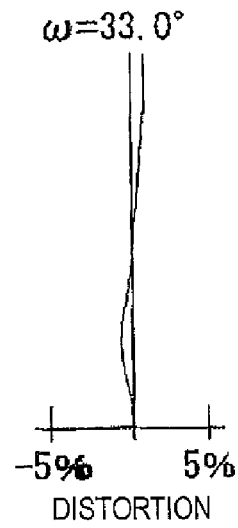
FIG. 24C shows distortion.
Figure 25A:
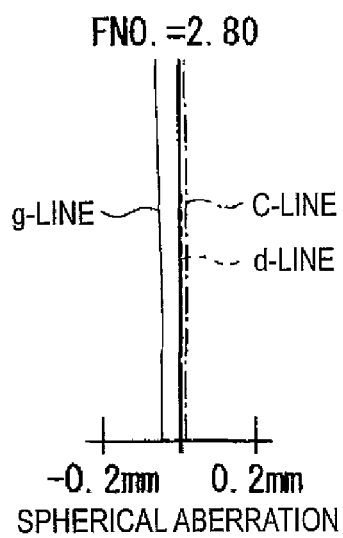
FIG. 25A shows a spherical aberration.
Figure 25B:
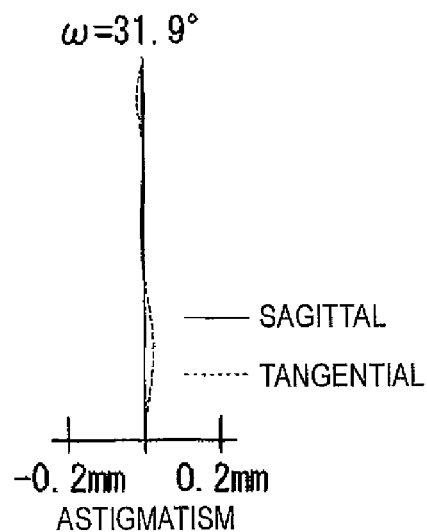
FIG. 25B shows astigmatism.
Figure 25C:
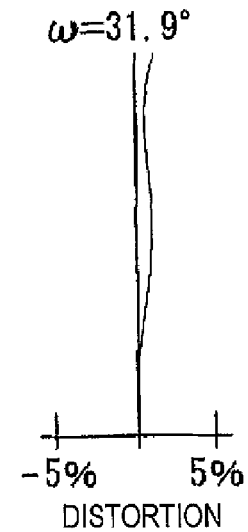
FIG. 25C shows distortion.
Figure 26A:
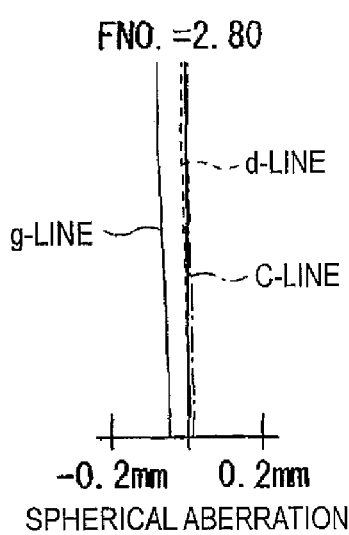
FIG. 26A shows a spherical aberration.
Figure 26B:
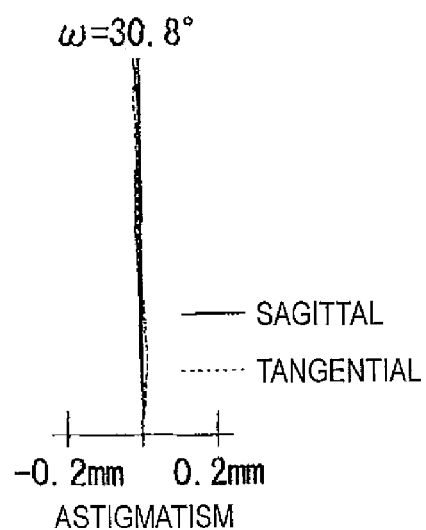
FIG. 26B shows astigmatism.
Figure 26C:
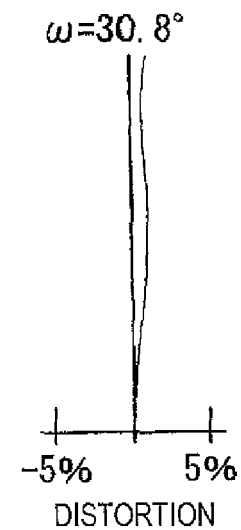
FIG. 26C shows distortion.
Figure 27A:
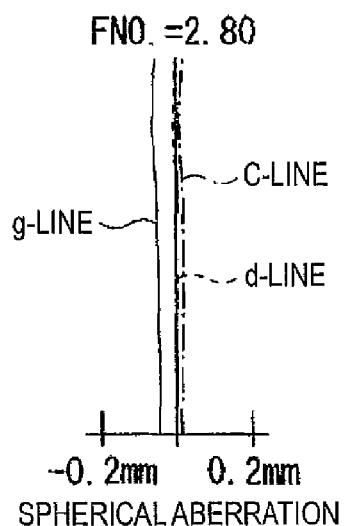
FIG. 27A shows a spherical aberration.
Figure 27B:
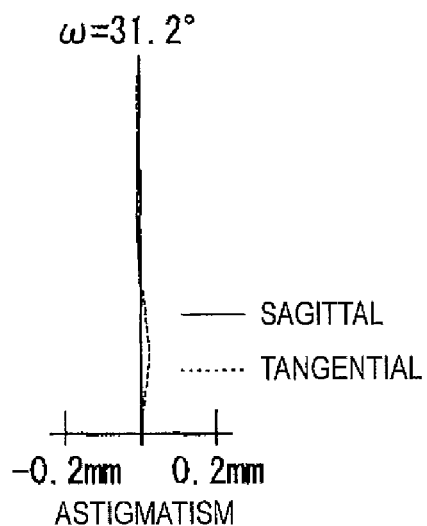
FIG. 27B shows astigmatism.
Figure 27C:
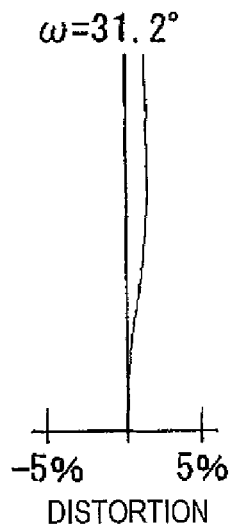
FIG. 27C shows distortion.
Figure 28A:
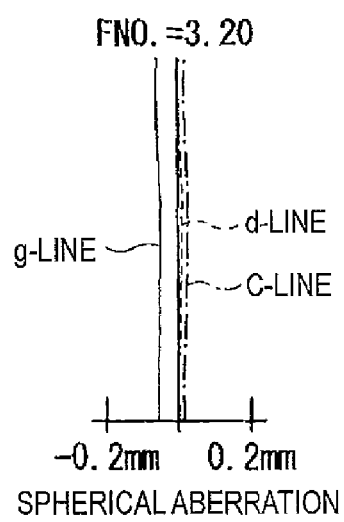
FIG. 28A shows a spherical aberration.
Figure 28B:
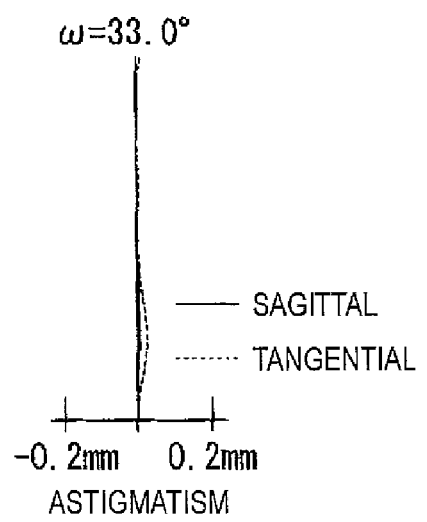
FIG. 28B shows astigmatism.
Figure 28C:
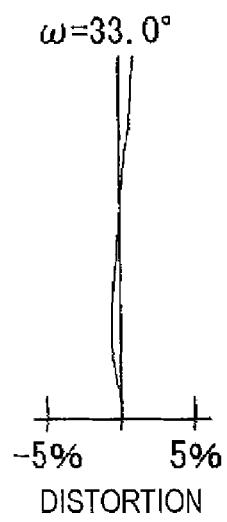
FIG. 28C shows distortion.
Figure 29A:
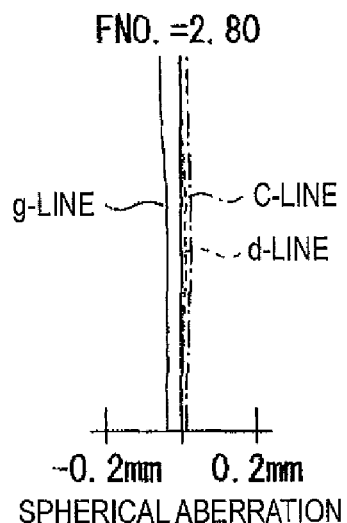
FIG. 29A shows a spherical aberration.
Figure 29B:
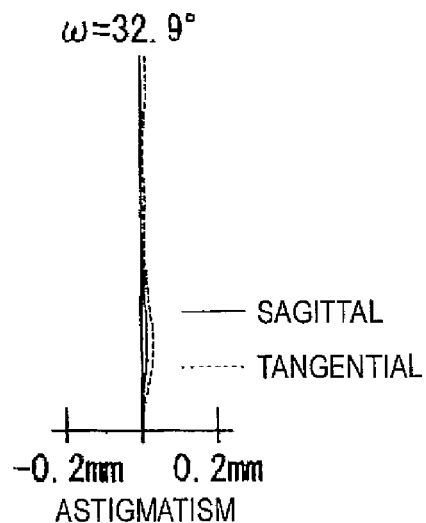
FIG. 29B shows astigmatism.
Figure 29C:
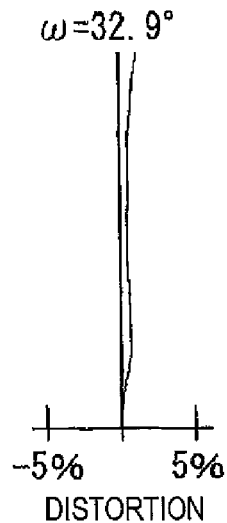
FIG. 29C shows distortion.
Figure 30A:
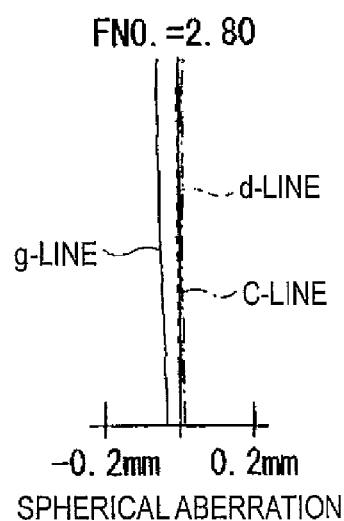
FIG. 30A shows a spherical aberration.
Figure 30B:
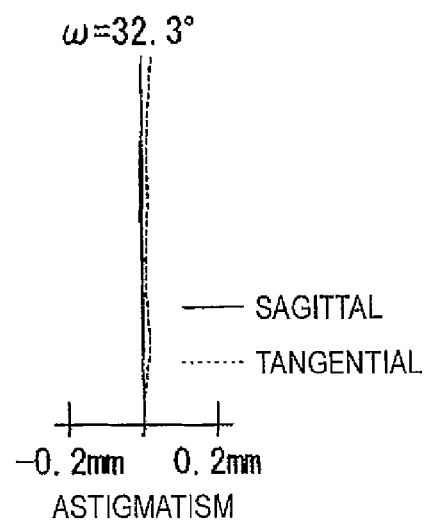
FIG. 30B shows astigmatism.
Figure 30C:
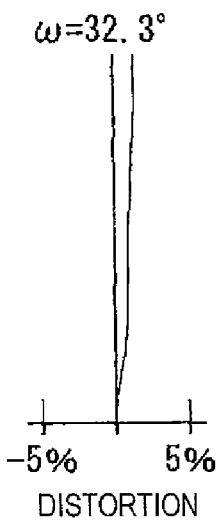
FIG. 30C shows distortion.
Figure 31A:
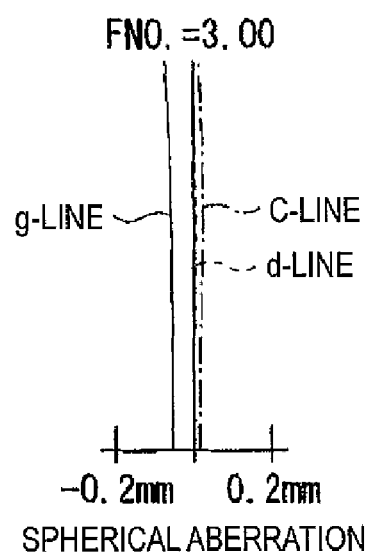
FIG. 31A shows a spherical aberration.
Figure 31B:
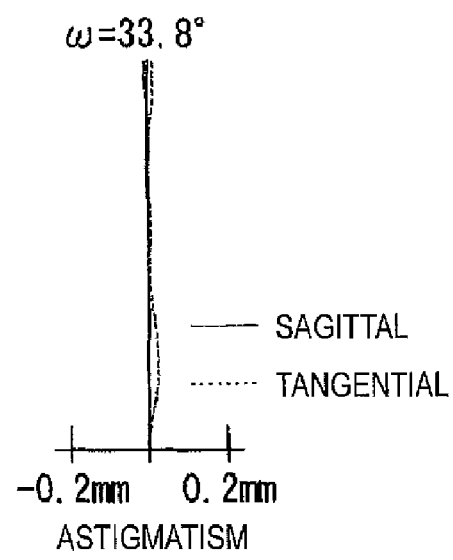
FIG. 31B shows astigmatism.
Figure 31C:
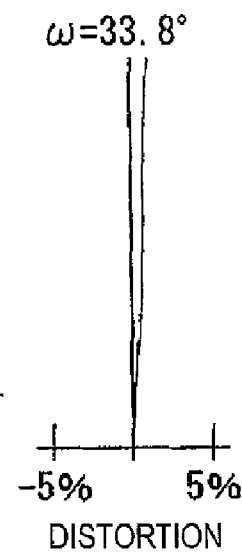
FIG. 31C shows distortion.

Likewise, aberrations in Example 2 are shown in FIGS. 23A through 23C; aberrations in Example 3 are shown in FIGS. 24A through 24C; aberrations acquired in Example 4 are shown in FIGS. 25A through 25C; aberrations in Example 5 are shown in FIGS. 26A through 26C; aberrations in Example 6 are shown in FIGS. 27A through 27C; aberrations in Example 7 are shown in FIGS. 28A through 28C; aberrations in Example 8 are shown in FIGS. 29A through 29C; aberrations in Example 9 are shown in FIGS. 30A through 30C; and aberrations in Example 10 are shown in FIGS. 31A through 31C.

As is evident from the foregoing respective sets of numerical data and aberration diagrams, the lens material, the shape of the lens surface, and the refractive power of the respective lenses are optimized in the respective Examples having the lens configuration of three lenses as a whole, and a compact, high-performance imaging lens system is embodied.

The present invention is not limited to the embodiments and the examples but is susceptible to various modifications. For instance, curvature radii, on-axis surface spacing, and refractive indices of respective lens components are not limited to values represented by the respective numerical examples and may assume other values.

This application claims foreign priority from Japanese Patent Application Nos. 2007-30912 filed Feb. 9, 2007, the contents of which is herein incorporated by reference.

What is claimed is:

1. An imaging system comprising: in order from an object side of the imaging system,
an aperture diaphragm; and
an imaging lens consisting of a first lens, a second lens and a third lens,
said first lens having a positive refractive power and having a convex surface on the object sides,
said second lens having a negative refractive power and having a concave surface on the object side,
said third lens having a meniscus shape having a convex surface on the object side in the vicinity of an optical axis thereof, the third lens having a negative refractive power in the vicinity of the optical axis thereof,
each of the first lens, the second lens and the third lens having at least one aspherical surface, and
the imaging lens satisfying conditional expressions:

$$0.9 < |f2/f| < 11 \quad (1)$$

$$1.2 < |f3/f| < 100 \quad (2)$$

wherein
f represents a focal length of the imaging lens;
f2 represents a focal length of the second lens; and
f3 represents a focal length of the third lens.

2. The imaging system according to claim 1, further satisfying a conditional expression:

$$0.05 < |f1/f2| < 1.0 \quad (3)$$

wherein f1 represents a focal length of the first lens.

3. The imaging system according to claim 1, further satisfying a conditional expression:

$$v1 - v2 > 20 \quad (4)$$

wherein v1 represents an Abbe number of the first lens at the d-line, and v2 represents an Abbe number of the second lens at the d-line.

4. The imaging system according to claim 1, wherein the second lens has a meniscus shape in the vicinity of the optical axis thereof.

5. The imaging system according to claim 2, further satisfying a conditional expression:

$$v1 - v2 > 20 \quad (4)$$

wherein v1 represents an Abbe number of the first lens at the d-line, and v2 represents an Abbe number of the second lens at the d-line.

6. The imaging system according to claim 2, wherein the second lens has a meniscus shape in the vicinity of the optical axis thereof.

7. The imaging system according to claim 5, wherein the second lens has a meniscus shape in the vicinity of the optical axis thereof.

8. An imaging system comprising: in order from an object side of the imaging system,
an aperture diaphragm;
a first lens having a positive refractive power and having a convex surface on the object side;
a second lens having a negative refractive power and having a concave surface on the object side; and a third lens having a meniscus shape having a convex surface on the object side in the vicinity of an optical axis thereof, the third lens having a negative refractive power in the vicinity of the optical axis thereof, each of the first lens, the second lens and the third lens having at least one aspherical surface, the imaging lens satisfying conditional expressions:

$$0.9 < |f2/f| < 11 \qquad (1)$$

$$1.2 < |f3/f| < 100 \qquad (2)$$

wherein
- f represents a focal length of the imaging lens;
- f2 represents a focal length of the second lens; and
- f3 represents a focal length of the third lens,
- wherein said aperture diaphragm is placed on at a position closer to an image side than an object-side plane apex position of the first lens.

9. The imaging system according to claim 1, wherein said aperture diaphragm is placed at the front side of the first lens.

10. The imaging system according to claim 1, further comprising an infrared cut-off filter interposed between the third lens and an imaging element.

11. The imaging system according to claim 1, wherein the first lens has a meniscus shape.

12. The imaging system according to claim 1, wherein the first lens has a biconvex shape in the vicinity of the optical axis.

13. An imaging system comprising: in order from an object side of the imaging system,
- an aperture diaphragm;
- a first lens having a positive refractive power and having a convex surface on the object side;
- a second lens having a negative refractive power and having a concave surface on the object side; and
- a third lens having a meniscus shape having a convex surface on the object side in the vicinity of an optical axis thereof, the third lens having a negative refractive power in the vicinity of the optical axis thereof,
- each of the first lens, the second lens and the third lens having at least one aspherical surface,
- the imaging lens satisfying conditional expressions:

$$0.9 < |f2/f| < 11 \qquad (1)$$

$$1.2 < |f3/f| < 100 \qquad (2)$$

wherein
- f represents a focal length of the imaging lens;
- f2 represents a focal length of the second lens; and
- f3 represents a focal length of the third lens,
- wherein the first lens has a meniscus shape, and the image-side surface of the first lens has a convex shape toward the image side at a peripheral portion.

14. The imaging system according to claim 1, wherein the image-side surface of the third lens has an aspherical shape and at least one point of inflection.

15. The imaging system according to claim 1, wherein the object-side surface of the third lens has at least two points of inflection.

16. The imaging system according to claim 1, wherein the image-side surface of the third lens that is the closest to the imaging element is formed so as to become concave toward the image side in the vicinity of the optical axis and convex toward the image side at the peripheral portion, whereby an aberration is corrected at each angle of view and an angle of incidence of a light flux into an imaging element is controlled.

17. The imaging system according to claim 1, wherein both faces of the first lens, the second lens and the third lens are aspherical surfaces.

* * * * *